(12) United States Patent
Sarrade et al.

(10) Patent No.: US 6,387,341 B1
(45) Date of Patent: May 14, 2002

(54) METHOD FOR MAKING SINGLE OR MIXED METAL OXIDES OR SILICON OXIDE

(75) Inventors: Stéphane Sarrade, Montpellier; Luc Schrive, Pont Saint Esprit; Christian Guizard; Anne Julbe, both of Montpellier, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/423,795
(22) PCT Filed: May 14, 1998
(86) PCT No.: PCT/FR98/00963
§ 371 Date: Mar. 13, 2000
§ 102(e) Date: Mar. 13, 2000
(87) PCT Pub. No.: WO98/51613
PCT Pub. Date: Nov. 19, 1998

(30) Foreign Application Priority Data

May 15, 1997 (FR) .......................................... 97 05994

(51) Int. Cl.$^7$ .............................................. C01B 33/12
(52) U.S. Cl. ..................... 423/335; 423/609; 423/625; 423/635; 423/592; 423/608; 65/17.2
(58) Field of Search ................................. 423/335, 338, 423/595, 598, 600, 606, 607, 624, 625, 630, 635, 636, 637; 65/17.2

(56) References Cited

U.S. PATENT DOCUMENTS 4,619,908 A * 10/1986 Cheng et al. ................ 502/214
5,391,364 A * 2/1995 Cogliati ....................... 423/335
5,409,683 A * 4/1995 Tillotson et al. ............. 423/338
5,738,801 A * 4/1998 Ziegler et al. ................. 252/62

FOREIGN PATENT DOCUMENTS

EP 0 225 785 6/1987

OTHER PUBLICATIONS

Patent Abstracts of Japan, Publication No. 02001122, Publication Date 05–=01–90.

WO 94/01361 (Jan. 20, 1994).

WO 85/00993 (Nov. 14, 1985).

* cited by examiner

Primary Examiner—Steven P. Griffin
Assistant Examiner—Edward M. Johnson
(74) Attorney, Agent, or Firm—Pearne & Gordon LLP (57) ABSTRACT

This invention relates to a method of manufacturing a product based on a simple or mixed metal oxide, or silicon oxide, from a charge of one or more precursors comprising one or more organic precursors. These oxides can be, for example, oxides of Ti, Al, Mg, Th, Si, Ba, Bc or Zr etc. The method comprises bringing the charge of organo-metallic precursors into contact with a reaction medium that comprises supercritical $CO_2$, at a temperature of from 31 to 100° C. and a supercritical pressure of from $3\times10^7$ to $5\times10^7$ Pa, in order to form from the precursor, a product based on a simple or mixed metal oxide, or silicon oxide, from the reaction medium by reducing the pressure of the supercritical $CO_2$ to a pressure lower than the supercritical pressure.

24 Claims, 1 Drawing Sheet

METHOD FOR MAKING SINGLE OR MIXED METAL OXIDES OR SILICON OXIDE

DESCRIPTION

TECHNOLOGICAL FIELD OF THE INVENTION

This invention relates to a method of manufacturing a product based on a simple or mixed metal oxide, or silicon oxide, from one or more organic precursors using supercritical $CO_2$ as a reaction medium.

These metal oxides can be, for example, oxides of titanium, aluminum, magnesium, thorium, barium, beryllium, zirconium etc.

This method, depending on the operating conditions leads to products in the form of liquids, gels, powders, fibers etc being obtained.

One of the objectives of the invention is the formation of a powder, with a particle size and a particle geometry that is controllable as a function of the operating conditions used for its manufacture and the method of separation of the product obtained. Furthermore, the method of the invention permits the manufacture of a powder composed of nanometric particles.

These powders find application, for example, in the manufacture of ceramic materials, this manufacture requiring specially developed raw materials.

In effect, by doping a $Si_3N_4$ ceramic with 5% SiC, in the form of nanometric particles, a nanocomposite ceramic is obtained five times more resistant to the propagation of cracks than the initial $Si_3N_4$ ceramic. The nanoparticles are used here as dampers, absorbing applied mechanical stresses and allowing atomic planes to slide.

In addition, by using a nanocomposite ceramic formed only from nanometric particles, a nanocomposite is obtained with properties of toughness and ductility comparable to steel. Prospective applications are, for example, for engines, turbines and in space, for example as a refractory coating for space craft.

From the point of view of medical research, nanocomposite ceramics are being studied for the production of prostheses, for example hips and vertebrae, which are mechanically strong and compatible with the human body which is not the case for steel.

Furthermore, in the manufacture of these ceramic materials, an amorphous structure of the initial powder permits, in certain cases, sintering at a lower temperature.

Another example of a use of these compounded powders is the doping of ferromagnetic materials. In effect, when doped by nanoparticles, the ferromagnetic materials can acquire strong magnetization under a very small energizing field. This phenomenon, known by the name "superparamagnetism" has a direct application in the improvement of reading heads for magnetic tapes and disks.

The method of manufacture according to the invention, also allows the manufacture of metal oxide powders which could find application in optics, for example, as surface coatings to improve the absorbing power in the visible spectrum, while at the same time reducing the losses of infra-red radiation.

Numerous other examples of uses of these powders based on oxides can be mentioned such as the manufacture of micro-porous solids used as catalysts, the manufacture of stationary phases for solid phase chromatography, the manufacture of selective membranes for nanofiltration, the separation of gases etc.

PRIOR ART

The production of an oxide powder can be provided from four manufacturing routes, the solid, liquid, gaseous and supercritical routes.

The solid routes very often require the application of a mechanical step, for example, grinding, abrasion etc. in order to obtain a desired particle size distribution for the powder. These methods, economically cost-effective, do not allow one to control precisely the size of the final particles and in particular to develop sub-micron particles.

The major problem with production of powders by a liquid route is the agglomeration of particles. In effect, the removal of the solvent, the seat of the reactions, generally brings about the partial agglomeration of the particles, sometimes making it difficult to use them industrially.

The sol-gel method also permits the manufacture of a fine metal oxide powder. This method consists of preparing a stable suspension of condensed species, in a liquid, from precursors (mineral salts or organo-metallic compounds). This suspension forms, from these condensed species, an amorphous three dimensional network in the sol that imprisons a fraction of the liquid, leading to the formation of a gel. The powder is obtained by the total removal of the liquid from this gel.

The precursors used in the sol-gel route for the preparation of oxide powders are organo-metallic precursors such as alkoxides or mineral precursors such as metal salts or hydroxides.

When the precursors are alkoxides, their activity can be modified notably by using complexing agents such as acetyl acetone which blocks the alkoxy groups. One then obtains modified alkoxides.

The gaseous routes do not allow one to obtain amorphous oxide powders because of the high temperatures generally used.

As for the supercritical routes, they are used in various techniques for the preparation of powders, for example, the hydrothermal synthesis technique, supercritical drying and reactions in a supercritical medium.

Hydrothermal synthesis is carried out under supercritical conditions, that is to say at a pressure greater than $2.2 \times 10^7$ Pa, and at a temperature greater than 374° C. Water is used for the development of large crystals by slow crystal growth.

Supercritical drying consists of removing a solvent while circumventing its critical point, that is to say by passing in a continuous way from the liquid to the gaseous state.

As for reactions in a supercritical medium, the document The Journal of Supercritical Fluids 4, p.55, 1991, describes a study of the solubility and the thermal resistance of organo-metallic compounds in supercritical $CO_2$ at 150 and 170° C. for a range of pressures between $1.2 \times 10^7$ and $2.2 \times 10^7$ Pa.

The document The Journal of Material Science 27, 1992, 2 187-2 192, describes the synthesis of sub-micron $MgAl_2O_4$ powders in a supercritical ethanol medium from the double alkoxide $Mg[Al(O-SecBu)_4]_2$. This synthesis is carried out at about 360° C.

The document Materials Chemistry and Physics 32, 1992, pages 249 to 254, describes the synthesis of sub-micron powders of titanium oxides, in the vapor, liquid and supercritical phase. The synthesis of titanium oxide in supercritical phase is carried out at about 350° C. in a supercritical ethanol medium.

The document Silicates Industriels, 1994, 3–4, pages 141 to 143, describes the use of supercritical fluids as reaction media for the synthesis of ceramic powders. The powders formed are powders of titanium oxides and of the spinel $MgAl_2O_4$. The supercritical fluid used is a supercritical ethanol medium and the reaction temperature is about 360° C.

DESCRIPTION OF THE INVENTION

The invention relates to a method of manufacturing a product based on a simple or mixed metal oxide, or silicon oxide, from a charge of one or more precursors comprising one or more organo-metallic precursors, said method comprising bringing the charge of precursor(s) into contact with a reaction medium comprising supercritical $CO_2$, at a temperature of from 31 to 50° C. and a supercritical pressure of from $10^7$ to $5\times10^7$ Pa in order to form, from said precursor, a product based on a simple or mixed metal oxide or silicon oxide; and the separation of said product based on a simple or mixed metal oxide or silicon oxide, or organo-metallic product(s), from the reaction medium by reducing the pressure of the supercritical $CO_2$ to a pressure lower than the supercritical pressure.

The precursor charge may comprise one or more organo-metallic precursors only, but may also include, in addition to the organo-metallic precursor(s), organic compounds, such as, for example, iso-propanol, acetyl acetone etc.

The precursor or precursors are, for example, alkoxide precursors, identical to those used for the sol-gel route.

These precursors can be modified, notably by complexing agents such as acetyl acetone which blocks the alkoxy groups and thereby reduces the reactivity of the alkoxide with respect to hydrolysis.

These alkoxide precursors are, for example, tetra-ethoxy silane, titanium (IV) iso-propoxide, aluminum iso-propoxide, magnesium ethoxide or a mixture of these alkoxides.

When the alkoxide precursor is tetra-ethoxy silane, it may, for example, be used alone as the precursor charge, that is to say without a solvent.

When the alkoxide precursor is titanium (IV) iso-propoxide, it may, for example, be used alone as the precursor charge, that is to say without a solvent When the alkoxide precursor is a mixture of aluminum iso-propoxide and magnesium ethoxide, the precursor charge can, for example, be formed from a mixture of first and second individual solutions; the first individual solution comprising, for example, magnesium ethoxide, iso-propanol and acetyl acetone, and the second individual solution comprising, for example, aluminum iso-propoxide, iso-propanol and acetyl acetone.

According to the method of the invention, the reaction medium may contain only supercritical $CO_2$, or supercritical $CO_2$ in the presence of a co-solvent, for example, water or ethanol. The co-solvent is preferably in a minority concentration in the reaction medium.

When the co-solvent is water, the method consists of a hydrolysis-condensation of the alkoxide in a supercritical $CO_2$ medium. The water enables one, for example, to provide a wide range of textures of the manufactured product in the case of products based on silicon oxide and titanium oxide.

When the co-solvent is, for example, ethanol
  the ethanol will allow the preferential dissolution of the organo-metallic precursor(s) in the supercritical $CO_2$ and therefore permit the reaction itself;
  the ethanol, as an alcohol, also allows association of organo-metallic precursor molecules in the form of a dimer, or a trimer, making them more or less reactive.
  it can exchange with the alkoxide groups of the precursor (s) and modify its reactivity; for example, the exchange between a propoxide group and the ethanol on the metal in order to form an ethoxide increases the reactivity of the precursor.

Other co-solvents can be used for the same purpose, such as aliphatic or aromatic solvents or halogenated solvents.

According to the invention, bringing the charge, comprising said precursor into contact with a reaction medium comprising the supercritical $CO_2$, can be carried out, for example, for a duration ranging up to 72 hours, preferably 20 hours. A long contact time between the charge of precursor (s) comprising one or more organic precursors and the medium comprising the supercritical $CO_2$ permits good initiation of the process of forming the product based on a metal oxide.

The supercritical $CO_2$ is used as a solvent and as a reaction medium, it has the physical and chemical properties of a liquid and of a gas. Supercritical $CO_2$ encourages the collision of the molecules in the reaction medium and because of this improves the reaction kinetics between these molecules.

According to the invention, a reaction medium comprising supercritical $CO_2$ is used at a temperature of from 31 to 100° C., preferably from 31 to 50° C. and more preferably 40° C.

The supercritical pressure can be, for example from $10^7$ to $5\times10^7$ Pa, preferably $3\times10^7$ Pa.

This method is therefore completely different to that described in the document Silicates Industriels, 1994, 3–4, pages 141 to 143, in which the supercritical medium is a supercritical ethanol medium and the supercritical temperature is of the order of 360° C.

The separation of the product based on the oxide formed, from the reaction medium, can be carried out by reducing the pressure of the supercritical $CO_2$, to a pressure lower than the supercritical pressure of the $CO_2$ and at a constant temperature. This pressure reduction of the supercritical $CO_2$ can be carried out by several procedures, for example by a "one time" procedure, in order to recover in one operation, all of the oxide based products formed.

The supercritical pressure reduction can also be carried out in several pressure reduction stages that allow one to obtain different fractions of the product formed, which differ from one another by the size and/or the structure of the particles which make up this product.

When the pressure reduction is carried out in stages, the pressure reduction stages each correspond preferably to pressure drops of from $10^5$ to $5\times10^6$ Pa.

The pressure reduction of $CO_2$ can also be carried out in a progressive manner without staging the pressure reduction. This progressive pressure reduction is also called "slow pressure reduction".

Depending on the pressure reduction procedure used (rapid, staged or progressive), one can direct the growth or the formation towards a particulate morphology or a fibrillar morphology. This has been brought to the fore, for example, when using silicon alkoxide.

When the pressure reduction is progressive, it is from $10^5$ to $10^7$ Pa/min., preferably from $10^5$ to $10^6$ Pa/min., and more preferably at $5\times10^5$ Pa/min.

The method according to the invention can be carried out in any system comprising the following elements: a reservoir of $CO_2$, in the liquid state, a high pressure $CO_2$ pump, a hot exchanger used to bring the super-pressurized $CO_2$ to the supercritical state, a sealed pressurizable reaction tank, for example an autoclave, in which the contacting of the precursor charge and the reaction medium comprising supercritical $CO_2$ is carried out, means of reducing the pressure from the supercritical pressure, and means of recovering the products formed, these elements being linked by a sealed and pressurizable circuit.

This type of installation allows one, for example, to recover the products formed directly in the reaction vessel, by reducing the pressure of the supercritical $CO_2$. This may, for example, be the "one time" pressure reduction of the SC $CO_2$ described above, for the recovery, in one operation, of all the oxide based products formed in the reaction vessel. The pressure reduction will be carried out, for example, by causing the $CO_2$ to escape through vents.

When a co-solvent is used, for example, water or ethanol, a second vessel can be put in series with the first reaction vessel in the sealed circuit. This second vessel subsequently called the solvent vessel, is sealed and pressurizable, and is, for example a second autoclave that includes the co-solvent. In this case, when a co-solvent is being used, the $CO_2$ is first passed into the second autoclave containing the co-solvent, that is to say, the water or the ethanol, and then it is passed into the reaction vessel. In this case, the product can also be recovered "in a single operation" in the reaction vessel, for example, by causing the $CO_2$ to escape through vents.

In order to obtain different fractions of the product formed which differ in the size and/or the structure of the particles that make up the product, from the reaction medium contained in the extractor, a system can be used that allows controlled pressure reductions of the supercritical $CO_2$ to be made followed by successive recoveries of the products. The recovery of the product is carried out here by pressure reduction stages. The system is connected to the reaction vessel by a sealed and pressurizable circuit.

An example of such a system is the separation system described in the patent application EP-A-0 238 527. This system comprises different separators, called "cyclone separators" and permit one to fractionate the products arising from the contact of the charge of precursor(s) with the reaction medium comprising the supercritical $CO_2$. The cyclone separators operate according to the principle according to which:

a pressure drop of a supercritical solvent causes a decrease in the solvent power of this supercritical solvent. Hence a pressure drop of a supercritical mixture causes a decease in the solubility of the products which are dissolved in it.

In this cyclone separator, the pressure drop is associated with a "cyclone effect", that is to say, the supercritical mixture is injected into the upper part of the cyclone separator (an autoclave with a conical shape), tangentially to the side wall. This type of injection accentuates the segregation between the supercritical solvent and the products which are dissolved in it, the solvent is discharged through the upper part of the cyclone separator, while the product is extracted in the lower part of this cyclone separator.

The mixture can, for example, be subjected to a first pressure reduction in a first cyclone separator enabling the collection of a first fraction comprising the oxide based products that are the least soluble in supercritical $CO_2$, that is to say the heaviest.

The reaction medium resulting from this first pressure reduction can, for example then be passed through a sealed and pressurizable circuit to a second cyclone separator so as to be subjected to a second pressure reduction and permitting the collection of a second fraction comprising oxide based products that are less heavy than those collected in the first fraction.

At the same supercritical pressure as that of the second cyclone separator, the mixture resulting from this second cyclone separator can then, for example, be passed into a recovery column comprising liquid $CO_2$. The oxide based products, which are the most soluble, that is to say the lightest are then recovered in a final fraction.

In order to recover the product by slow pressure reduction of the supercritical $CO_2$, a system analogous described for pressure reduction in stages, can, for example, be used.

According to the invention, the recovery of the product based on a simple or mixed metal oxide, or silicon oxide, can be followed by an aging treatment step for said product for a period ranging, for example, up to 45 days. This aging treatment, subsequent to the supercritical treatment is, preferably, of the order of 30 days.

The aging treatment can be carried out in the supercritical $CO_2$ medium or outside of it.

The aging treatment is, for example, carried out at ambient temperature, for example, about 25° C.

It allows the growth of particles from species formed in the SC $CO_2$ in the presence or not of a co-solvent, that is to say, the formation of definitive materials.

When this treatment is carried out in the supercritical $CO_2$ medium, it is carried out at a pressure ranging from $10^7$ to $5 \times 10^7$ Pa.

According to the method of the invention, when the desired product is a product based on titanium oxide, the organic precursor can be titanium (IV) iso-propoxide. Hence the precursor charge will include titanium (IV) iso-propoxide.

When the desired product is a product based on silicon oxide, the organic precursor can be tetra-ethoxy silane. Hence the precursor charge will include tetra-ethoxy silane.

When the desired product is a product based on magnesium oxide and aluminum oxide, the organic precursors can be magnesium ethoxide and aluminum iso-propoxide. Hence the precursor charge will include magnesium ethoxide and aluminum iso-propoxide.

The method of the invention allows one to develop new types of materials based on oxides chosen from among the oxides of titanium, aluminum, magnesium, thorium, silicon, yttrium, barium, beryllium, zirconium, vanadium, hafnium, scandium, chromium, niobium, molybdenum, lanthanum, tantalum, tungsten etc., using supercritical $CO_2$ as a reaction medium.

The alkoxide precursors used are the same as those traditionally used for the sol-gel route and bringing them into the presence of $CO_2$ in the supercritical state has lead to original products being obtained in the form of a liquid, gel, powder, fiber etc.

For example, for products based on Si oxide, the operations carried out lead to the formation of a wider spectrum of textures than those observed in the prior art. The textures obtained, are, for example, in the form of fibers, small spherical particles with or without points, conical shapes, gangues etc.

The operating conditions, for example the choice of co-solvent, the mode of pressure reduction, the level of sampling and the contact time permits one to direct the texture of the desired final product. In particular, moist Si gels manufactured according to the method of the invention have pore volumes (measured by thermoporometry) of about 0.5 to 1.5 $cm^3.g^{-1}$, much greater than those usually measured for Si gels obtained by the traditional sol-gel route from the same precursor. Furthermore, gels dried at 100° C. keep high pore volumes of from 0.5 to 0.7 $cm^3/g$ and high specific surfaces of from 480 to 760 $m^2/g$.

For products based on Ti oxide, the method of the invention additionally permits the formation of an amorphous powder, dry or in solution which has very interesting textural characteristics in comparison with the powders traditionally obtained through the sol-gel route. In particular, specific surfaces for a powder ranging from about 400 to 500 $m^2.g^{-1}$, have been obtained, that is to say twice as high as those obtained by the sol-gel route from the same precursor, for a smaller and relatively homo-dispersed particle size distribution. The pore volume of the titanium oxide powder obtained by the method of the invention is from 0.2 to 0.3 $cm^3.g^{-1}$.

From a practical point of view, the spherical morphology of the powders obtained by the method of the invention leads to better reactivity to sintering up to 1100° C. This type of powder, pretreated at 450° C. before compaction, allows access to materials consolidated at a lower temperature than those derived from the traditional sol-gel method.

For example, for products based on oxides of Mg and Al, the method of the invention has lead to the formation of several crystalline forms of acetyl acetonate.

Taken as a whole, the products formed are of a new type and they allow one to carry out the development of materials with interesting properties.

It is possible to mention, for example, the tangential filtration membranes with a compressed layer of $TiO_2$ and the catalysts.

The characteristics and advantages of the invention will better become apparent on reading the description that follows. This description rests on embodiment examples, given for explanation purposes only, being not limitative and making reference to the appended FIGURE.

DETAILED DESCRIPTION OF EMBODIMENTS OF THE INVENTION

Figure 1:
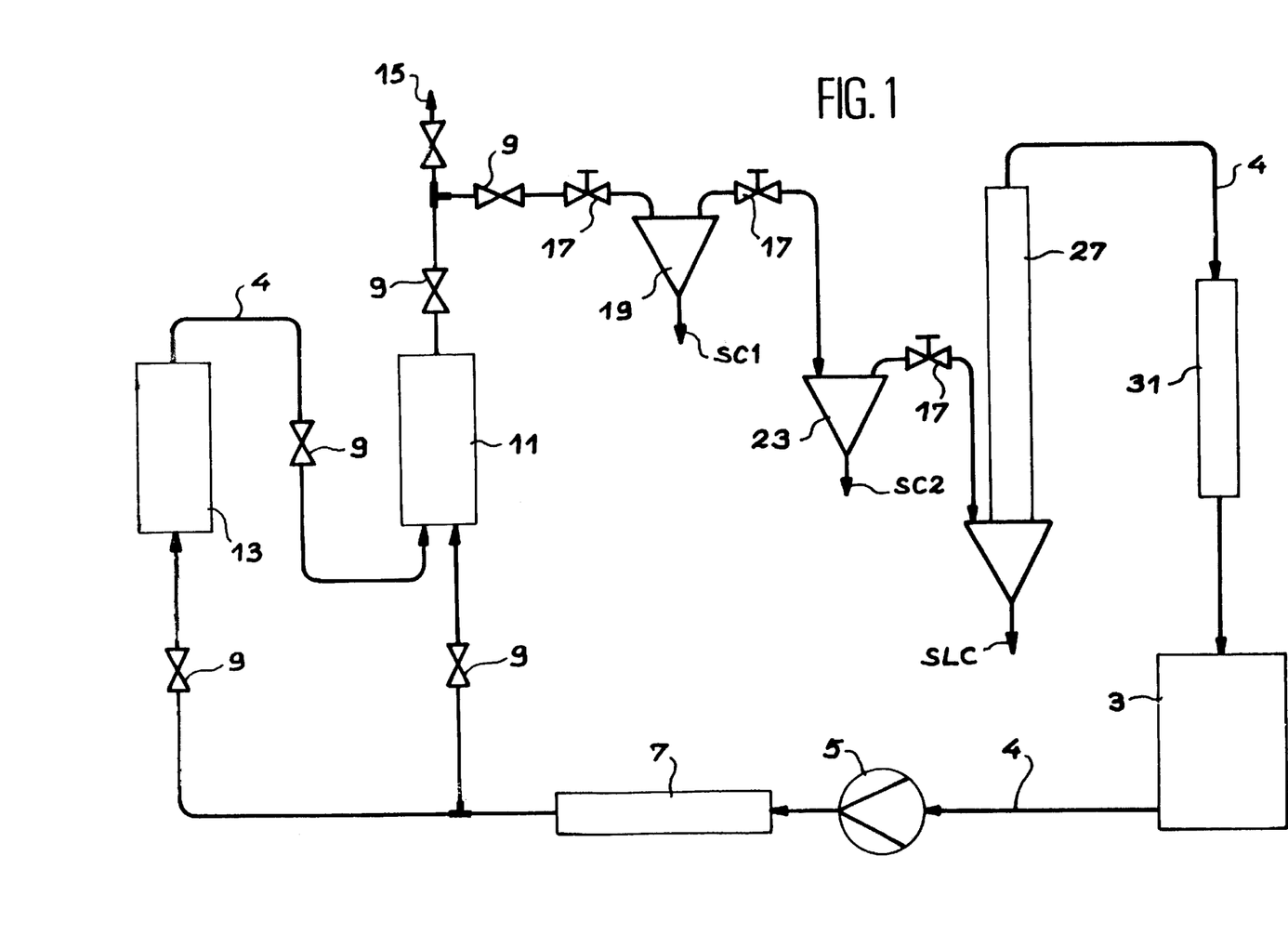
The single FIGURE is a diagrammatic representation of an example of an installation for the implementation of the method of manufacturing an oxide according to the invention.

An example of a device that permits one to implement the method according to the invention is shown diagrammatically in the single FIGURE. This device comprises:

- a reservoir (3) for $CO_2$ in the liquid state,
- a high pressure, $CO_2$ pump (5)
- a hot exchanger (7) used to bring the over-pressurized $CO_2$ into the supercritical state
- a reaction vessel (11), for the purpose of containing the oxide precursor and the reaction medium,
- a solvent vessel (13) for the purpose of containing a co-solvent such as ethanol or water,
- two cyclone separators (19, 23),
- a liquid separator (27)+column, and
- a cold exchanger (31).

These units are assembled in a closed circuit and connected to one another by a sealed circuit (4). Manual valves (9) and pressure reducing valves (17) are mounted in the sealed circuit to control the input and the output of the products from each unit of the device being used.

The reaction vessel (11) and the solvent vessel (13) are pressurizable sealed vessels and are, for example, autoclaves.

In addition, this device includes vents (15).

When the reaction medium contains only supercritical $CO_2$, the supercritical $CO_2$ coming from the hot exchanger (7) passes directly into the reaction vessel (11) containing the alkoxide precursor charge.

When the reaction medium comprises supercritical $CO_2$ in the presence of a co-solvent, for example, water or ethanol, the supercritical $CO_2$ is first passed into the solvent vessel (13) containing the co-solvent and then using the manual valve situated between the solvent vessel (13) and the reaction vessel (11) containing the alkoxide precursor, the supercritical $CO_2$, charged with co-solvent, is passed into the reaction vessel (11).

If the oxide based product formed must be recovered directly in the reaction vessel, that is to say in the extractor, it is possible to reduce the pressure of the installation by directly releasing the $CO_2$ through the vents (15).

For fractionated recovery of the oxide based product contained in the supercritical $CO_2$, the mixed product based on oxide and the supercritical $CO_2$ is fed into the system that allows controlled pressure reduction of the supercritical $CO_2$, immediately followed by successive recovery operations for the products.

This system of separation is described in the patent application EP-A-0 238 527.

The separators are cyclone separators (19, 23). The product/supercritical $CO_2$ mixture is subjected to a first pressure reduction in a first cyclone separator (19) using a first pressure reducing valve (17) and the least soluble products, that is to say the heaviest products, are collected in the first fraction (27), hereafter designated SC1.

The mixture from this cyclone separator (19) can then be passed, using a second pressure reducing valve (17), into a second cyclone separator (20). This mixture is then subjected to a second pressure reduction and a second fraction (25) is collected, hereafter designated SC2.

Using a third pressure reducing valve (17), the mixture from the second cyclone separator passes into a recovery column (27), or separator (27), containing liquid $CO_2$ and the most soluble solutes, that is to say the lightest solutes are then recovered in the extract (29) hereafter designated SLC.

The gaseous $CO_2$ remaining is low pressure $CO_2$, that is to say, it is at a pressure of from $7 \times 10^6$ to $8 \times 10^6$ Pa, and it no longer contains any oxide based product. This low pressure $CO_2$ is liquefied in a cold exchanger (31) at the outlet from the recovery column (27). Once cooled, the $CO_2$ becomes liquid and goes back into the liquid $CO_2$ reservoir (3), thereby closing the circuit of the installation.

In the examples of the implementation of the method of the invention given below, two series of operations are being carried out.

A first series of operations, designated C, have the purpose of finding out the extraction kinetics of the oxide based product. These operations are direct extraction tests, in which the supercritical $CO_2$ is passed onto the precursor charge with or without the presence of a co-solvent. The recovery of the extracts arising from these C operations is carried out in the separators (19), (23) and (27) in order to obtain the fractions SC1, SC2 and SLC respectively.

The C operations are carried out with a constant flow rate of supercritical $CO_2$ passing through the reaction vessel, or, in the presence of a co-solvent, passing through the solvent vessel and then the reaction vessel. This $CO_2$ flow rate allows one to pass the products formed in the reaction vessel immediately into the system of separators. Glass beads have been placed in the extractor in such a way that carry over of the charge by the supercritical $CO_2$ is prevented. The flow rate of the supercritical $CO_2$ is about 10 kg/h.

A second series of operations, designated E, is intended to find out the effect of the contact time between the precursor charge and the supercritical $CO_2$, with or without the presence of a co-solvent, water or ethanol. These operations are in fact extractions after aging.

In these E operations, the precursor charge is brought into contact with the supercritical $CO_2$ under pressure in the reaction vessel, for a contact time fixed at from 0 to 72 hours, with or without the presence of a co-solvent.

The pressure reduction is then carried out through the successive separators (19), (23) and (27) and enables extracts SC1, SC2 and SLC respectively to be obtained.

The operating conditions and the naming of these operations C and E are grouped together in Table 1 below.

TABLE 1

Names and conditions of the operations

| Operations | Solvent | Pressure (Pa) | Temperature (° C.) | Contact time |
|---|---|---|---|---|
| C1 | SC $CO_2$ only | $3 \times 10^7$ | 40 | — |
| C2 | SC $CO_2$ + $H_2O$ | $3 \times 10^7$ | 40 | — |
| E1 | SC $CO_2$ only | $3 \times 10^7$ | 40 | 20 |
| E2 | SC $CO_2$ + $H_2O$ | $3 \times 10^7$ | 40 | 20 |
| E3 | SC $CO_2$ + $H_2O$ | $2 \times 10^7$ | 40 | 20 |
| E4 | SC $CO_2$ + $C_2H_5OH$ | $3 \times 10^7$ | 40 | 20 |

The mass of alkoxide precursor, tipped into the reaction vessel is between 40 and 50 g.

During the operations with a co-solvent, about 200 g of water or of ethanol, according to the case, are tipped into the solvent vessel.

The samples analyzed can have, at the end of the operations, four possible origins: the residue from the precursor charge, designated RES and the extracts SC1, SC2 and SLC. The analyses of these extracts obtained are directed towards:

the mass balance for the manufacture of products,
the morphology of the products formed determined by scanning electron microscopy and field effect microscopy,
the chemical nature of the powders determined by infrared spectroscopy (FTIR) for carbonates and by X-ray spectrometry with energy dispersion (EDX) and by X-ray diffraction for crystallinity,
the porous texture of the gels by thermoporometry, and of the powders by absorption-desorption of $N_2$,
the crystallization phenomena and the thermal stability determined by differential thermal analysis (DTA) and thermo-gravimetric analysis (TGA), respectively, and
the sintering behavior determined by dilatometry.

EXAMPLE 1

Manufacture of a Product Based on Silicon Oxide

In this example, the charge of precursor is made up of 98% pure tetra-ethoxy silane, of molecular weight 208.33 g.mol$^{-1}$ and of density d=0.934. For example, this product available in the ALDRICH catalogue and has the number 13.190.3.

For this precursor, tetra-ethoxy silane, particular E operations were carried out in addition to those described previously:

starting with the operating conditions of the E2 operation, the contact time was fixed at 2 hours, 10 hours, 20 hours and 72 hours, p1 starting with the operating conditions of the E2 operation, one continued with fast pressure reduction designated DR below, for a period of 30 minutes and with slow pressure reduction, designated DL below, for a period of 3 hours.

These fast and slow pressure reductions have been carried out by reducing the pressure of the supercritical $CO_2$ from $3 \times 10^7$ to $10^5$ Pa.

Table 2 shows a mass balance for the manufacture of a product based on silicon oxide according to the method of the invention.

Table 3 shows a morphology record sheet for the products obtained as a function of the operating conditions of the method of the invention in this example.

TABLE 2

Mass balance for the formation of products based on Si

| Tests | Initial mass of co-solvent g | Final mass of co-solvent g | Δ mass of co-solvent g | Initial mass of precursor g | Final mass of residue g | Δ mass of product g | SC1 extract g | SC2 extract g | SLC extract g | Total mass of extracted product g | Quantity of $CO_2$ used kg |
|---|---|---|---|---|---|---|---|---|---|---|---|
| C1 | — | — | — | 46.66 | 3.29 | 43.37 | 0.54 | 7.6 | 3.32 | 11.46 | 66.36 |
| C2 | water/203.72 | 150.14 | 53.38 | 46.82 | 2.37 | 44.45 | 29.6 | 7.13 | 14.15 | 50.88 | 40.25 |
| E1 | — | — | — | 46.92 | 11.99 | 34.93 | 16.69 | 14.87 | 1.93 | 33.49 | 1.66 |
| E2 | water/201.8 | 196.03 | 5.77 | 46.95 | 12.41 | 34.54 | 17.32 | 14.81 | 0.87 | 33 | 1.3 |
| E3 | water/202.2 | 197.01 | 5.19 | 48.74 | 7.47 | 41.27 | 12.77 | 20.17 | 3.86 | 36.8 | 1.3 |
| E4 | ethanol/163.1 | 52.27 | 110.83 | 48.52 | 35.48 | 13.04 | — | 7.17 | 2.34 | 9.51 | 1.5 |
| E2 2H | water/203.22 | 199.93 | 3.29 | 49.33 | 9.46 | 39.87 | 9.49 | 23.6 | 2.04 | 35.13 | 1.4 |
| E2 20H | water/202.12 | 193.59 | 8.53 | 48.43 | 7.17 | 41.26 | 4.61 | 11.98 | 13.2 | 29.79 | 1.4 |
| E2 72H | water/202.7 | 189.36 | 13.34 | 48.57 | 5.39 | 43.18 | 17.24 | 13.75 | 3.93 | 34.92 | 1.52 |
| E2 DR | water/205.03 | 197.08 | 7.95 | 48.94 | 8.85 | 40.09 | 28.9 | 7.21 | 1.96 | 38.07 | 1.5 |
| E2 DL | water/205.2 | 200.32 | 4.88 | 48.34 | 6.26 | 42.08 | 7.25 | 14.34 | 9.88 | 31.47 | 1.5 |

TABLE 3

Morphological records as a function of operating conditions

| Test | Sample | Contact time (hours) | Morphological record |
|---|---|---|---|
| C2 | SLC | 0 | Almost dense |
| C2 | SC2 | 0 | Vaporous (very small intermixed fibers) |
| E1 | SLC | 20 | Almost dense |
| E1 | SC2/SLC | 20 | Large and small intermixed fibers |
| E2 | SC2/SLC | 20 | Spar grains + balls + gangue |
| E2 | RES | 2 | Spar grains + balls + poorly formed fibers |
| E2 | RES | 10 | Clusters of parallel fibers (L~10 μm) |
| E2 | RES | 72 | Shell texture + linking gangue |
| E2 | SLC | 2 | Balls with fine spines + grains + gangue |

TABLE 3-continued

Morphological records as a function of operating conditions

| Test | Sample | Contact time (hours) | Morphological record |
|---|---|---|---|
| E2 | SLC | 10 | Clusters of parallel fibers (L~10 μm) |
| E2 DR | RES | 20 | Film of fibers with flat and parallel areas (L~40 μm) |
| E2 DR | SLC | 20 | Balls with fine spines + grains + gangue |
| E2 DL | RES | 20 | Oriented growth of short conical "fibers" (L~20 μm) |
| E2 DL | SLC | 20 | Long flexible tangled fibers |
| E3 | RES | 20 | Organized texture of shells + gangue |
| E3 | SC2 | 20 | Large balls (5 to 10 μm) + gangue |

TABLE 3-continued

Morphological records as a function of operating conditions

| Test | Sample | Contact time (hours) | Morphological record |
|---|---|---|---|
| E3 | SLC | 20 | (+ spines) Poorly formed fibers + gangue + oriented texture of short cylindrical grains |
| E4 | RES | 20 | Homogeneous grains |
| E4 | SLC | 20 | Granular texture + gangue |
| E4 | SC2 | 20 | Almost dense texture |

The particular operations relating to the contact time have shown that in the residue RES (presence of $H_2O$ and pressure of the supercritical $CO_2$ of $3 \times 10^7$ Pa), contact times that are too short, that is to say less than 10 hours, lead to non-homogeneous mixtures with several textures (grains, balls, fibers, gangue). Long contact times, for example of 72 hours, lead to textures organized in the shape of cones. A texture similar to the latter has been obtained with a shorter contact time, of 20 hours, and a lower pressure of $2 \times 10^7$ Pa.

With the SLC sample, a contact time of 2 hours leads to a texture of a ball of fibers and a contact time of 10 hours leads to an orientated fibrous texture.

The particular operations relating to the mode of pressure reduction have shown that for the SLC extracts, in the case of a slow pressure reduction, long well-formed and homogeneous fibers are obtained. In the case of a fast pressure reduction, there is competition between spherical textures and well-orientated fibers.

In the case of residues, short and well-orientated fibers are obtained whatever the mode of pressure reduction.

The analyses of the samples E1 SLC, C2 SLC and E4 RES by IR spectroscopy have shown bands characteristic of Si—O—Si linkages and Si—OH bonds and have not shown bands characteristic of carbonate formation.

It will also be noted that the extracts studied do not show $CH_x$ bands which are characteristic of the starting alkoxide except when ethanol is used as a co-solvent.

The porous texture of the gels obtained during C2 operations and dried at 100° C., have been analyzed by adsorption-desorption of nitrogen.

Table 4 below shows the pore properties of these three studied gels.

TABLE 4

Pore properties of dried silica gels

| Samples (gel dried at 100° C.) | BET surface area ($m^2.g^{-1}$) | Micro-porous surface area ($m^2.g^{-1}$) | Total pore volume ($cm^3.g^{-1}$) | Micro-porous volume ($cm^3.g^{-1}$) | Pore size distribution MESO/MACRO (DIAMETER) | Pore size distribution MICRO (RH) |
|---|---|---|---|---|---|---|
| C2 SC2 lower part | 764 | 340 | 0.54 | 0.16 | narrow centered on 3.8 nm | Double 0.4 and 0.8 nm |
| C2 SC2 supernatant | 596 | 83 | 0.52 | 0.03 | narrow + tail centered on 3.8 nm | Simple 0.4 nm |
| C2 SLC | 483 | 268 | 0.73 | 0.12 | Very broad centered on 50 nm | Simple 0.28 nm |

The nitrogen adsorption-desorption isotherms of the dried gels at 100° C. typically show the hysteresis properties of meso-porous systems.

The specific surfaces of the gels, analyzed by the Brunauer, Emmet and Teller (BET) Method, are relatively high and are between about 480 and 760 $m^2 .g^{-1}$.

The BJH method (Barret, Joyner and Hallenda) has been used to study the meso-porous part of the C2 SC2 and C2 SLC gels.

The micro-porous part of the C2 SC2 and C2 SLC gels and, more particularly, the distribution of the hydraulic radii has been studied by the MP method of Brunauer. The three gels studied show a double distribution of pore sizes: one in the micro-porous domain and the other in the meso-macroporous domain. The C2 SC2 gels (supernatant and the lower part) show two homo-dispersed distributions in pore size while those of the SLC gel range from the microporous domain to pores of 200 nm diameter.

The micro-pore volume is smaller in the upper part of the C2 SC2 gel than in the lower part of the SC2 gels and the SLC gel.

The study by thermoporometry of the C2 SC2 gel shows that the opaque vaporous gel of the upper part has a pore size distribution with a very broad range of from 3 to 20 nm and the corresponding pore volume is very high (1.554 $cm^3.g^{-1}$). The liquid gel of the lower part shows a pore size distribution that is relatively narrow, centered on 3.5 nm and a pore volume of 0.683 $cm^3 .g^{-1}$, that is relatively high.

These results are entirely unusual and show that the method allows access to gels with very vaporous textures.

The thermo-gravimetric analyses show that the dried C2 gels lose between 35 and 50% of their weight when they are heated to 900° C., the temperature at which this loss of weight stabilizes itself. The supernatant C2 Sc2 gel is the one which loses the most weight, that is to say up to 50%, while the C2 SC2 gel from the lower part loses 44% and the C2 SLC gel only loses 35% of its weight. These losses correspond to free solvent losses up to 200° C. and then to losses of bonded water and to condensations of surface hydroxyl groups at a higher temperature.

The materials obtained, by the method according to the invention, from a traditional Si organo-metallic precursor show morphologies that are entirely original compared with those observed in the prior art, following a traditional sol-gel synthesis.

As a function of the operating conditions of this new process, that is to say the sampling locations and modes of pressure reduction, the type of co-solvent, the contact time, organized or disorganized textures have been obtained.

In particular, Si gels have been manufactured and they have pore volumes (1.5 cm$^3$.g$^{-1}$) much greater than those measured for traditional Si gels of the prior art. Furthermore, after drying at 100° C., these silica gels can have specific surfaces ranging up to 764 m$^2$.g$^{-1}$.

On the other hand, the samples obtained do not as a general rule, show traces of carbonate formation, which would make them susceptible to sintering.

In conclusion, these new morphologies of products based on silicon oxide produced from a traditional precursor lead to the creation of original materials based on Si.

EXAMPLE 2

Manufacture of a Product Based on Titanium Oxide

In this example, the precursor charge is made up of 97% pure titanium iso-propoxide, with a molecular weight of 284.26 g.mol.$^{-1}$ and a density d=0.955. This product is available, for example, in the ALDRICH catalogue under the number 20.527.3.

The operations described in Table 1 were carried out, without studying the influence of the method of pressure reduction or that of contact time.

For the whole of the type C and E operations, the method leads, in relation to the operating conditions, to amorphous products of variable macroscopic and microscopic morphological appearance.

Table 5 shows the mass balance for the formation of metal oxide based products according to the method of the invention.

Table 6 shows a morphological record of the products obtained and the effect of the operating conditions of the method.

TABLE 6

Morphological record

| Test | Sampling | Textural appearance | Grain diameter ($\mu$m) |
|---|---|---|---|
| C2 | RES | Homogeneous spherical grains in a heap | 0.5 to 1 |
| C2 | SC1 | Spherical grains in a cluster | 0.2 to 1.5 |
| C2 | SC2 | Spherical grains in dense heaps with some larger balls | 0.1 1.2 to 2 |
| E1 | SLC | An almost dense structure | |
| E2 | SLC | Dense and fissured structure | |
| E3 | RES | Dense stmcture heavily fissured | |
| E3 | SC1 | Dense structure + porous structure in places | |
| E4 | RES | Homogeneous spherical grains in a heap | ~2 |
| E4 | SLC | Homogeneous spherical grains in a heap | ~0.1 |

The C2 and E4 extracts lead to the formation of a powder. The analyses of the products formed were directed towards these two extracts.

In the extract C2 RES, from 48 g of precursor, that is to say titanium (IV) iso-propoxide, about 2 g of a dry powder with an apparent density approximately equal to 50 kg/m$^3$ was recovered from the reaction vessel, 10 to 40 g of water had been consumed. This powder corresponds to the residue RES hereafter designated C2 RES. For information, in the case of a total conversion of 48 g of titanium iso-propoxide into titanium based oxide, 13.4 g of TiO$_2$ would have been recovered with consumption of 12 g of water. Hence the yield is 15%.

Observations with a scanning electron microscope reveal that this powder is homogeneous and made up of relatively spherical particles that are not agglomerated and have sizes ranging from 0.1 $\mu$m to 1 $\mu$m. After calcination at 480° C., the size of the particles of the powder practically does not change, but the creation of bridges between particles is observed.

IR spectroscopy of this powder has made clear the absence of carbonates in the powder. In effect no important absorption band was observed between 1300 and 1500 cm$^{-1}$.

The differential thermal analyses (DTA) have allowed one to show that the powder, amorphous to X-rays at the start, crystallizes in a relatively clear-cut way at 392° C. in the form of anatase. The rutile form begins to appear from 700° C. onwards.

TABLE 5

Mass balance for the formation of products based on Ti

| Tests | Initial mass of co-solvent g | Final mass of co-solvent g | Δ mass of co-solvent g | Initial mass of precursor g | Final mass of residue g | Δ mass of product g | SC1 extract g | SC2 extract g | SLC extract g | Total mass of extracted product g | Quantity of CO$_2$ used kg |
|---|---|---|---|---|---|---|---|---|---|---|---|
| C2 | water/199.57 | 189.23 | 10.34 | 48.36 | 2 | 46.36 | 0.47 | 1.33 | 0 | 1.8 | 1.9 |
| E1 | — | — | | 49.98 | 14.74 | 35.24 | 9.47 | 0 | 0.51 | 9.98 | 1.66 |
| E2 | water/201.7 | 192.39 | 9.31 | 50.27 | 9.99 | 40.28 | 2.52 | 0 | 6.18 | 8.7 | 1.68 |
| E3 | water/200.44 | 189.77 | 10.67 | 50.3 | 17.72 | 32.58 | 55.9 | 0 | 4.7 | 60.6 | 1.57 |
| E4 | ethanol/164 | 48.63 | 115.37 | 49.92 | 43.54 | 6.38 | 46.2 | 8.89 | 4.97 | 60.06 | 1.5 |

*: Tests involving changing the quantity of precursor and/or water

The porous texture of this powder C2 RES dried at 100° C. has been analyzed by nitrogen adsorption-desorption. This analysis has also been carried out on the extracts C2 SC1 and C2 SC2. The results of these analyses are shown in Table 7 which summarizes the pore properties of the titanium oxide from extracts C2 RES, C2SC1 and C2 SC2.

TABLE 7

Pore properties of the titanium oxide

| Sample | Mean BET suface area ($m^2 \cdot g^{-1}$) | Total pore volume ($cm^3 \cdot g^{-1}$) | Micro-pore volume ($cm^3 \cdot g^{-1}$) | $r_H$ (nm) | $R_{BJH}$ (nm) |
|---|---|---|---|---|---|
| C2 RES dried at 100° C. | 437 | 0.235 | 0.203 | $0.45 < r_H < 0.7$ | 1 |
| C2 SC1 | 337 | 0.192 | 0.160 | $0.45 < r_H < 0.7$ | 1 |
| C2 SC2 | 424 | 0.285 | 0.180 | $0.4 < r_H < 0.9$ | 1 to 10 |

The powder C2 RES, dried at 100° C. is therefore essentially micro-porous with a hydraulic radius $r_H$ for the pores ranging from 0.45 to 0.7 nm. This result corresponds, with a hypothesis of pores resulting from a stacking of spherical particles, to a distribution of pores ranging from 1.2 to 2.0 nm.

After treatment at 480° C., the powder C2 RES becomes meso-porous and loses a large part of its total pore volume, this falling to 0.036 cm³/g. The specific surface therefore also falls and reaches a values of 28 m²/g.

The TGA analyses show that the powder C2 RES at the start containing residual water visible through infra-red spectroscopy, is subject to a weight loss of 25% up to 200° C. and that then this loss continues and stabilizes at 800° C. for a total loss of weight of 46%.

A dilatometric study of the C2 RES powder dried at 100° C. and then compacted at 7.85×10⁸ Pa into a tablet has been carried out. The tablet of C2 RES powder had a density of 1.48, before treatment. This study showed shrinkage, that is to say a contraction of the tablet of 1.15% between ambient temperature and 1450° C. At the end of the treatment, the tablet of C2 RES powder had a density of about 1.5 which corresponds to 35% of the theoretical density of rutile, this being equal to 4.25.

Another experiment was carried out on the C2 RES powder, pre-treated at 450° C. The tablet at 7.85×10⁸ Pa (8×10³ kgf/cm²) had a density before treatment of 1.82 or 42% of the theoretical density of rutile. This study showed a shrinkage of 8% between ambient temperature and 850° C. to 1000° C.; and 16.5% between ambient temperature and 1500° C.

At the end of the treatment, the tablet had a density of 3.7 i which corresponds to 87% of the theoretical density of rutile.

For the purposes of comparison, a TiO₂ powder prepared by the sol-gel route, from the same precursor as that used in this example is analyzed. This powder will be called the sol-gel powder. The sol-gel powder was dried at 100° C. This powder showed itself to be essentially micro-porous with a few meso-pores, and formed from compact grains about 8 nm in size.

Table 8 below is a comparative table showing the pore properties of this sol-gel powder and the pore properties of the powder from the C2 RES extract.

TABLE 8

Comparison of the pore properties of the sol-gel powder and the C2 RES powder of the invention

| Sample | Mean BET suface area ($m^2 \cdot g^{-1}$) | Total pore volume ($cm^3 \cdot g^{-1}$) | Micro-pore volume ($cm^3 \cdot g^{-1}$) | $r_H$ (nm) | $R_{BJH}$ (nm) |
|---|---|---|---|---|---|
| C2 RES powder dried at 100° C. | 437 | 0.235 | 0.203 | $0.45 < r_H < 0.7$ | 1 |
| Sol-gel powder dried at 100° C. | 218 | 0.119 | 0.116 | $0.35 < r_H < 1.1$ | 0.9 to 2 |

The hydraulic radius $r_H$ of the pores of the sol-gel powder has a broader distribution ranging from 0.35 to 1.1 nm than that of the C2 powder. This result corresponds, with a hypothesis of the stacking of spherical particles with a pore size distribution ranging from 1 to 3 nm.

The DTA of the sol-gel powder dried at 150° C. for 4 hours revealed a broad exothermic peak centered on 396° C. indicating slow crystallization of the amorphous phase into anatase.

A dilatometric study of the sol-gel powder pretreated at 450° C., compacted at 7.85×10⁸ Pa into the form of tablets has been carried out. The tablet of sol-gel powder had a density of 2.43 or 57% of the density of rutile, before treatment. This study showed shrinkage of 2.5% between ambient temperature and 800° C. to 1000° C., of 15% between ambient temperature and 1250° C. and of 17.5% between ambient temperature and 1450° C. Stabilization was observed at 1450° C. At the end of the treatment, the tablet of sol-gel powder had a density of 4.25 which corresponds to 100% densification.

In the E4 extract, from 49.92 g of precursor, that is to say of titanium (IV) iso-propoxide, about 43.54 g of powder was recovered.

This powder called E4, analyzed by infra-red spectroscopy showed the absence of carbonates.

After evaporation of the solvent (ethanol) at 150° C. for 3 hours, this powder proved to be made up of aggregates of spherical grains about 1 micron in size.

Table 9 below shows the results of the textural analysis of this E4 powder by nitrogen adsorption-desorption.

TABLE 9

Textural analysis of E4 powder

| Sample | BET surface area ($m^2 \cdot g^{-1}$) | Total pore volume ($cm^3 \cdot g^{-1}$) | Micro-pore volume ($cm^3 \cdot g^{-1}$) | mean $r_{BJH}$ (nm) |
|---|---|---|---|---|
| E4 Residue dried at 150° C. | 135 | 0.0647 | 0.0641 | 0.2 to 0.7 |

E4 powder showed itself to be entirely micro-porous (intra-granular porosity), with a pore volume of about 0.064 cm³/g and a hydraulic radius for the pores of 0.32 nm. With a hypothesis of the stacking of spherical particles, this corresponds to a mean pore size of 0.9 nm.

The TGA and DTA studies show a very clear-cut and very fine crystallization at 373° C. Parallel to this, the product undergoes a large weight loss of about 20% between 100 and 250° C. and then the weight stabilizes at about 700° C. for a total weight loss of 27%.

What is claimed is:

1. Method of manufacturing a product based on a simple or mixed metal oxide, or an oxide of silicon, from a charge of precursor(s) comprising one or more organo-metallic precursors, said method comprising the step of bringing the charge of precursor(s) into contact with a reaction medium comprising supercritical $CO_2$, at a temperature of 31 to 100° C. and a supercritical pressure of $10^7$ to $5 \times 10^7$ Pa, reacting said charge of precursor(s) in said reaction medium to form a product based on a simple or mixed metal oxide, or an oxide of silicon; and separating said product from said reaction medium by reducing the pressure of the supercritical $CO_2$ to a pressure lower than the supercritical pressure.

2. Method according to claim 1, in which the organo-metallic precursor is selected from the group consisting of an alkoxide and a modified alkoxide.

3. Method according to claim 2, in which said alkoxide is selected from the group consisting of tetra-ethoxy silane, titanium (IV) isopropoxide, aluminum isopropoxide, magnesium ethoxide and mixtures thereof.

4. Method according to claim 3, characterized in that the reaction medium comprises, in addition, a co-solvent.

5. Method according to claim 2, characterized in that the reaction medium comprises, in addition, a co-solvent.

6. Method according to claim 1, characterized in that the reaction medium comprises, in addition, a co-solvent.

7. Method according to any one of claim 4 to 6, characterized in that the co-solvent is water or ethanol.

8. Method according to claim 7, in which bringing said charge of precursor(s) into contact with the reaction medium is carried out during a period ranging up to 72 hours.

9. Method according to claim 8, in which bringing said charge of precursor(s) into contact with the reaction medium is carried out during a period of 20 hours.

10. Method according to any one of claims 1 to 6, in which bringing said charge of precursor(s) into contact with the reaction medium is carried out during a period ranging up to 72 hours.

11. Method according to claim 10, in which bringing said charge of precursor (s) into contact with the reaction medium is carried out during a period of 20 hours.

12. Method according to claim 1, comprising, in addition, after the step of separating said product based on a metal oxide or a silicon oxide from the reaction medium, an aging treatment step of said product during a period ranging up to 45 days.

13. Method according to claim 1, in which the pressure reduction of the supercritical $CO_2$, for the separation of the product from the reaction medium, is carried out in a single step.

14. Method according to claim 1, in which the pressure reduction of the supercritical $CO_2$, for the separation of the product from the reaction medium, is progressive and from $10^5$ Pa/min. to $10^7$ Pa/min.

15. Method according to claim 1, in which the pressure reduction of the supercritical $CO_2$, for the separation of the product from the reaction medium, is carried out in stages of about $10^6$ to $5 \times 10^6$ Pa.

16. Method according to claim 1, in which the oxide based product is selected from the group consisting of an oxide of silicon and a product based on a metal oxide wherein said metal oxide is an oxide of a metal selected from the group consisting of an oxide of titanium, aluminum, magnesium, thorium, yttrium, barium, beryllium, zirconium, vanadium, hafnium, scandium, chromium, niobium, molybdenum, lanathanum, tantalum and tungsten.

17. Method according to claim 1, in which conditions for bringing the charge of precursor(s) into contact with the reaction medium of supercritical $CO_2$ and mode of pressure reduction are chosen in relation to the characteristics of texture and porosity of said product.

18. Method of manufacturing a product based on titanium oxide according to claim 1, in which the precursor is titanium iso-propoxide.

19. Method of manufacturing a product based on silicon oxide according to claim 1, in which the precursor is tetra-ethoxy silane.

20. Method of manufacturing a product based on magnesium oxide and aluminum oxide according to claim 1, in which the precursor is a mixture of magnesium ethoxide and aluminum iso-propoxide.

21. Product based on a metal oxide, capable of being obtained by the method of claim 1, said product being a titanium oxide powder having a specific surface area of about 400 to 500 $m^2/g$ and a pore volume of 0.2 to 0.3 $cm^3/g$.

22. Product based on a metal oxide, capable of being obtained by the method of claim 1, said product being a moist silica gel having a pore volume of about 0.5 to 1.5 $cm^3 \cdot g^{-1}$.

23. Product based on a metal oxide, capable of being obtained by the method of claim 1, said product being a dry silica gel having a specific surface area of about 480 to 764 $m^2/g$.

24. Method according to claim 1, comprising, in addition, after the step of separating said product based on a metal oxide or a silicon oxide from the reaction medium, an aging treatment step of said product during a period of 30 days.

* * * * *